United States Patent
Kajiwara et al.

(10) Patent No.: US 8,396,308 B2
(45) Date of Patent: Mar. 12, 2013

(54) IMAGE CODING BASED ON INTERPOLATION INFORMATION

(75) Inventors: Hiroshi Kajiwara, Inagi (JP); Yuki Shiraishi, Tokyo (JP); Naoki Ito, Tokyo (JP); Hirokazu Tamura, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 719 days.

(21) Appl. No.: 12/620,241

(22) Filed: Nov. 17, 2009

(65) Prior Publication Data

US 2010/0142840 A1   Jun. 10, 2010

(30) Foreign Application Priority Data

Dec. 10, 2008  (JP) ................................ 2008-315030

(51) Int. Cl.
*G06K 9/36* (2006.01)
(52) U.S. Cl. ........................ 382/238; 382/239
(58) Field of Classification Search .................. 382/238, 382/239
See application file for complete search history.

(56) References Cited

U.S. PATENT DOCUMENTS

| | | | | |
|---|---|---|---|---|
| 4,468,808 A | * | 8/1984 | Mori et al. ..................... | 382/196 |
| 4,525,748 A | * | 6/1985 | Carbone ........................ | 358/2.1 |
| 4,709,394 A | * | 11/1987 | Bessler et al. ................. | 382/240 |
| 5,159,468 A | * | 10/1992 | Yoshida et al. ............... | 358/451 |
| 5,282,255 A | * | 1/1994 | Bovik et al. .................. | 382/239 |
| 5,583,953 A | * | 12/1996 | Harrington ................... | 382/239 |
| 5,740,285 A | * | 4/1998 | Bloomberg et al. .......... | 382/299 |
| 5,862,268 A | * | 1/1999 | Boehlke ........................ | 382/299 |
| 5,867,593 A | * | 2/1999 | Fukuda et al. ................ | 382/176 |
| 6,304,339 B1 | * | 10/2001 | Miller et al. .................. | 358/1.9 |
| 6,373,890 B1 | * | 4/2002 | Freeman ....................... | 375/240 |
| 6,442,297 B1 | * | 8/2002 | Kondo et al. .................. | 382/240 |
| 6,868,186 B1 | * | 3/2005 | Sadeh ............................ | 382/238 |
| 6,915,020 B2 | * | 7/2005 | Damera-Venkata et al. . | 382/253 |
| 7,085,379 B1 | * | 8/2006 | Kagechi et al. ............... | 382/166 |

(Continued)

FOREIGN PATENT DOCUMENTS

| | | |
|---|---|---|
| JP | 08-167030 | 6/1996 |
| JP | 10-173913 | 6/1998 |

(Continued)

OTHER PUBLICATIONS

Heesub Lee et al, "Lossless compression of medical images by prediction and classification" Optical Engineering, Jan. 1994, vol. 33, No. 1, pp. 160-166.

(Continued)

*Primary Examiner* — Wenpeng Chen
(74) *Attorney, Agent, or Firm* — Cowan, Liebowitz & Latman, P.C.

(57) ABSTRACT

Resolution interpolation data is generated by relatively simple processing. This enables image encoding by simple and quick processing to attain high image quality and high compression performance. To do this, a tile divider extracts tile data of 32×32 pixels from encoding target original image data. A resolution converter samples one pixel of a block of 2×2 pixels in the tile data, thereby generating reduced tile data of a reduced image. An interpolation data generator generates interpolation data to be used to generate tile data having the original resolution from the reduced tile data. Based on the interpolation data of a tile of interest, an encoding method selector outputs a control signal indicating which one of lossless encoding and lossy encoding should be executed for the reduced tile data. A code stream generator outputs the generated encoded data and interpolation data as encoded image data.

8 Claims, 13 Drawing Sheets

U.S. PATENT DOCUMENTS

| | | | |
|---|---|---|---|
| 7,139,099 B2 * | 11/2006 | Hashizume et al. | 358/2.1 |
| 7,477,802 B2 * | 1/2009 | Milanfar et al. | 382/299 |
| 7,545,997 B2 * | 6/2009 | Lieberman et al. | 382/298 |
| 8,229,234 B2 * | 7/2012 | Takada | 382/238 |
| 2001/0017705 A1 * | 8/2001 | Hashizume et al. | 358/1.9 |
| 2001/0019630 A1 * | 9/2001 | Johnson | 382/232 |
| 2006/0066909 A1 * | 3/2006 | Yamamoto | 358/3.13 |
| 2011/0206130 A1 * | 8/2011 | Koto et al. | 375/240.21 |
| 2012/0114228 A1 * | 5/2012 | Tamura | 382/162 |

FOREIGN PATENT DOCUMENTS

| | | |
|---|---|---|
| JP | 2001-313834 | 11/2001 |
| JP | 2001313834 A * | 11/2001 |

OTHER PUBLICATIONS

These reference were cited in an Aug. 2, 2012 U.S Office Action, of which is enclosed, that issued in related U.S. Appl. No. 12/620,194.

Paul J. Ausbeck Jr., Context Models for Palette Images, Data Compression Conference, IEEE Comput. Soc., Mar. 30, 1998 pp. 309-318 XP0102765700.

Nasir D. Memon et al, Lossless Image Compression: A Comparative Study, Proceedings of SPIE, Jan. 1, 1995 vol. 2418 pp. 8-20 XP000911800.

Whoi-Yul Kim et al, Hierarchy Embedded Differential Image for Progressive Transmission Using Lossless Compression, IEEE Transactions on Circuits and Systems for Video Technology, Feb. 1, 1995 vol. 5, No. 1, pp. 1-13 XP000488402.

The above references were cited in a European Search Report issued on Jan. 16, 2012, of which is enclosed, that issued in the corresponding European Patent Application No. 09174845.9.

* cited by examiner

STRUCTURE OF ENCODED DATA OF EACH TILE

| TILE HEADER | ENCODING METHOD SELECTION SIGNAL | ENCODED 1/4 REDUCED TILE DATA | LEVEL 2 INTERPOLATION DATA | LEVEL 1 INTERPOLATION DATA |
|---|---|---|---|---|

FIG. 9A

STRUCTURE OF ENCODED DATA

| TILE HEADER | ENCODED DATA OF T(0,0) TILE | ENCODED DATA OF T(1,0) TILE | ENCODED DATA OF T(W/Tw-1,0) TILE | ENCODED DATA OF T(0,1) TILE | ENCODED DATA OF T(W/Tw-1,H/Th-1) TILE |

FIG. 9B

STRUCTURE OF ENCODED DATA OF EACH TILE

| TILE HEADER | ENCODING METHOD SELECTION SIGNAL | ENCODED 1/2 REDUCED TILE DATA | INTERPOLATION DATA |

F I G. 12
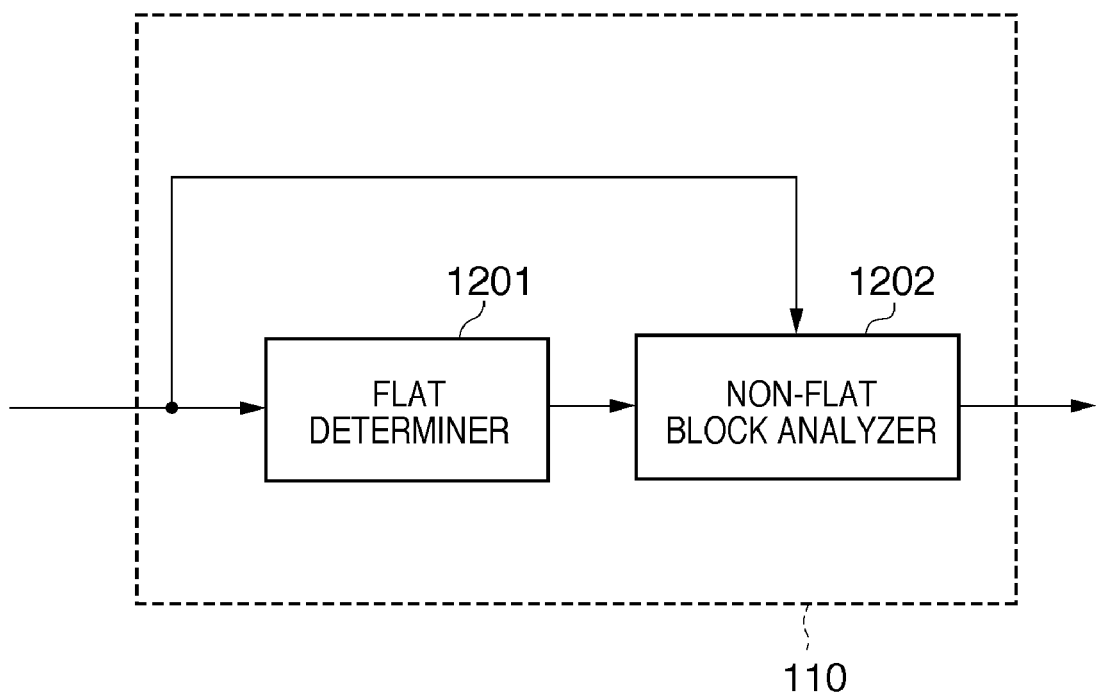

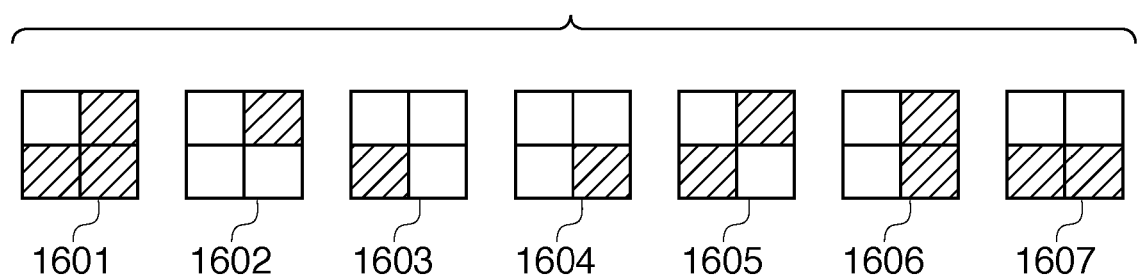
F I G. 16

IMAGE CODING BASED ON INTERPOLATION INFORMATION

BACKGROUND OF THE INVENTION

1. Field of the Invention

The present invention relates to an image encoding technique and, more particularly, to a technique of encoding high-resolution image data easily and efficiently.

2. Description of the Related Art

Conventionally, an image encoding technique has been proposed which includes a component for dividing an image into blocks each formed from m×n pixels and losslessly encoding each block and a component for performing lossy encoding, and outputs one of the encoding results as the ultimate encoded data of a block of interest.

In principle, this technique raises the compression ratio in, e.g., a natural image region where image quality degradation is relatively unnoticeable by selectively applying the lossy encoding method. In contrast, for a character, line, CG portion, and the like where image quality degradation is noticeable, visual image quality degradation is suppressed using the lossless encoding method.

To suppress image quality degradation and reduce the code amount, it is important to appropriately select the encoding method in each region. Japanese Patent Laid-Open No. 08-167030 is known as a method of selecting lossless or lossy encoding by referring to the information amount or the number of colors of losslessly encoded data.

Lossless encoding is often performed using a predictive coding technique or a run-length coding technique. Predictive coding obtains the predicted value of a pixel of interest from neighboring pixels, calculates a predictive error that is the difference between the predicted value and the actual pixel value of the pixel of interest, and encodes the predictive error. Run-length coding converts identical continuous pixel values into numerals indicating run lengths, thereby encoding image data. On the other hand, lossy encoding generally uses a transform encoding technique which converts image data into frequency domain data using DCT or wavelet transform and encodes coefficient values. For both the lossless and lossy encoding techniques, various kinds of contrivance have been proposed to attain higher compression performance by introducing more sophisticated calculations.

Along with the recent increase in the precision of image input/output devices, image data resolution is becoming higher. To quickly process high-resolution image data, hardware resources and process time more than before are necessary. For example, to cause an encoding apparatus for handling an image having a resolution of 1200 dpi to do encoding within the same time as an earlier apparatus for encoding a 600-dpi image, the internal calculation processing capability needs to be four times larger than before.

Since efficient lossless and lossy encoding processes require sophisticated calculation processing, there is demanded an image encoding technique capable of satisfying three conditions, i.e., compression performance, image quality, and calculation cost in balance.

SUMMARY OF THE INVENTION

The present invention has been made in consideration of the above problems, and provides an encoding technique of satisfying both high compression performance and high image quality by simple processing.

In order to solve the above problems, according to an aspect of the present invention, provided is an image encoding apparatus for encoding image data, comprising:

a reduced image generator which generates reduced image data for input image data of an encoding target by outputting one pixel corresponding to N pixels in the input image data;

an interpolation information generator which generates interpolation information to specify, from a plurality of types of interpolation methods, an interpolation method of N pixels of interest in order to generate, from the reduced image data, image data having a resolution identical to that of the input image data;

a lossless encoder which executes lossless encoding of a block in the reduced image data; a lossy encoder which executes lossy encoding of the block;

a selector which selects one of the lossless encoder and the lossy encoder based on the interpolation information corresponding to a block of interest in the reduced image data and causes the selected encoder to execute encoding processing of the block of interest; and an output unit which outputs, as encoded image data corresponding to the input image data, encoded data obtained by the encoder selected by the selector and the interpolation information generated by the interpolation information generator, wherein the types of interpolation methods represented by the interpolation information generated by the interpolation information generator include a first interpolation method of restoring the N pixels of interest from one pixel of a reduced image corresponding to the N pixels of interest or at least one pixel located around the one pixel of the reduced image, and a second interpolation method of restoring at least some of the N pixels of interest without referring to the reduced image.

According to the present invention, resolution interpolation data is generated by relatively simple processing. This enables performance of image encoding by simple and quick processing to attain high image quality and high compression performance. Especially, image data free from sensor noise such as a PDL rendering image is suitable for this encoding because its spatial redundancy is large and efficiently usable in reduction processing and interpolation data processing.

Further features of the present invention will become apparent from the following description of exemplary embodiments with reference to the attached drawings.

BRIEF DESCRIPTION OF THE DRAWINGS

FIGS. 9A and 9B are views showing the structures of encoded data according to the first and second embodiments;

FIG. 12 is a block diagram showing the internal arrangement of an interpolation data generator;

FIG. 16 is a view showing two-color arrangement patterns of a 2×2 pixel block.

DESCRIPTION OF THE EMBODIMENTS

The embodiments of the present invention will now be described in detail with reference to the accompanying drawings.

[First Embodiment]

Figure 1:
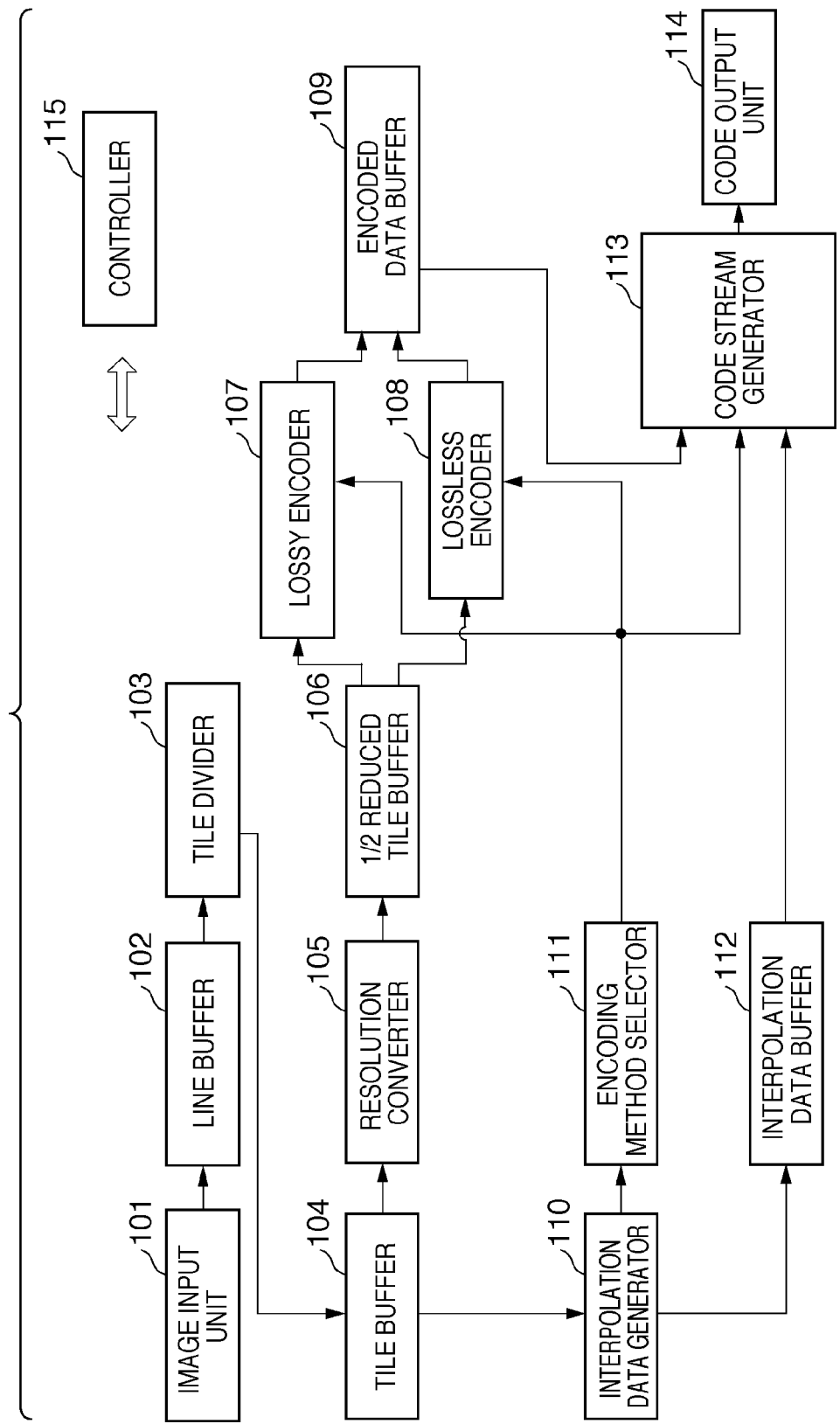
FIG. 1 is a block diagram of an image encoding apparatus according to the first embodiment.

FIG. 1 is a block diagram of an image encoding apparatus according to this embodiment.

In the image encoding apparatus of this embodiment, a reduced image generator generates reduced image data by outputting one pixel corresponding to N pixels of interest (N is an integer of 2 or more) in image data input from outside of the apparatus. More specifically, let M be the total number of pixels of input image data. The reduced image generator repeats the processing of outputting one pixel corresponding to N pixels of interest M/N times, thereby generating a reduced image including M/N pixels. An interpolation information generator generates interpolation information which specifies, from a plurality of types of interpolation methods, the interpolation method of the N pixels of interest to restore the original resolution image. Then, a code stream including the resolution interpolation data and the encoded data of the reduced image data is generated and output. The types of interpolation methods represented by the interpolation information generated by the interpolation information generator include a first interpolation method of restoring N pixels of interest from one pixel of a reduced image corresponding to the N pixels of interest or at least one pixel located around the one pixel of the reduced image, and a second interpolation method of restoring at least some of the N pixels of interest without referring to the reduced image.

Note that the input source of image data is an image scanner. However, the source may be of any other type such as a storage medium that stores image data as a file or a rendering unit that renders an image based on information such as print data. In this embodiment, an example will be described in which the number of pixels represented by "N" is 2×2 (=four pixels).

Encoding target image data of the image encoding apparatus according to this embodiment is RGB color image data. Each component (color component) is 8-bit pixel data which expresses a luminance value in the range of 0 to 255. The encoding target image data is formed by arranging pixels point-sequentially, i.e., in the raster scan order. The pixel data are arranged in the order of R, G, and B. The image is formed from W horizontal pixels×H vertical pixels. For descriptive convenience, each of W and H is assumed to be an integer multiple of an encoding process unit, i.e., tile size (32 pixels in both the horizontal and vertical directions in this embodiment) to be described later. However, the color space of the input image data need not always be RGB but can be, for example, YCbCr or CMYK. The color space can be of any type and have any number of components. Additionally, the number of bits of one component is not limited to eight. The number of bits may exceed eight.

Encoding processing of the image encoding apparatus shown in FIG. 1 will be explained below. Referring to FIG. 1, a controller 115 controls the operation of the entire image encoding apparatus in FIG. 1. The processing units cooperatively operate under the control of the controller 115.

An image input unit 101 sequentially inputs encoding target image data and outputs them to a line buffer 102. The image data are input in the raster scan order, as described above.

The line buffer 102 has an area to store a predetermined number Th of lines of the image data and sequentially stores the image data received from the image input unit 101. Th is the number of vertical pixels of a rectangular block (tile) extracted by a tile divider 103 to be described later. In this embodiment, Th is "32". Data obtained by dividing the encoding target image data by the width of Th lines will be referred to as a stripe hereinafter. The capacity required by the line buffer 102, i.e., the data amount of one stripe is W×Th×3 (corresponding to RGB) bytes. As described above, the number H of vertical pixels is an integer multiple of Th, for the descriptive convenience, so no incomplete stripe is generated at the end of the image.

When the line buffer 102 stores image data of one stripe, i.e., image data of Th lines, the tile divider 103 divides the image data of Th lines stored in the line buffer 102 into rectangular blocks each including Tw horizontal pixels×Th vertical pixels. Each block is read out and stored in a tile buffer 104. As described above, the number W of horizontal pixels of the encoding target image is an integer multiple of Tw. For this reason, no incomplete block is generated upon dividing to rectangular blocks. The rectangular block formed from Tw horizontal pixels×Th vertical pixels will be referred to as a "tile" hereinafter. Note that in this embodiment, since Tw=Th=32, the size of one tile is 32×32 pixels.

Figure 8:
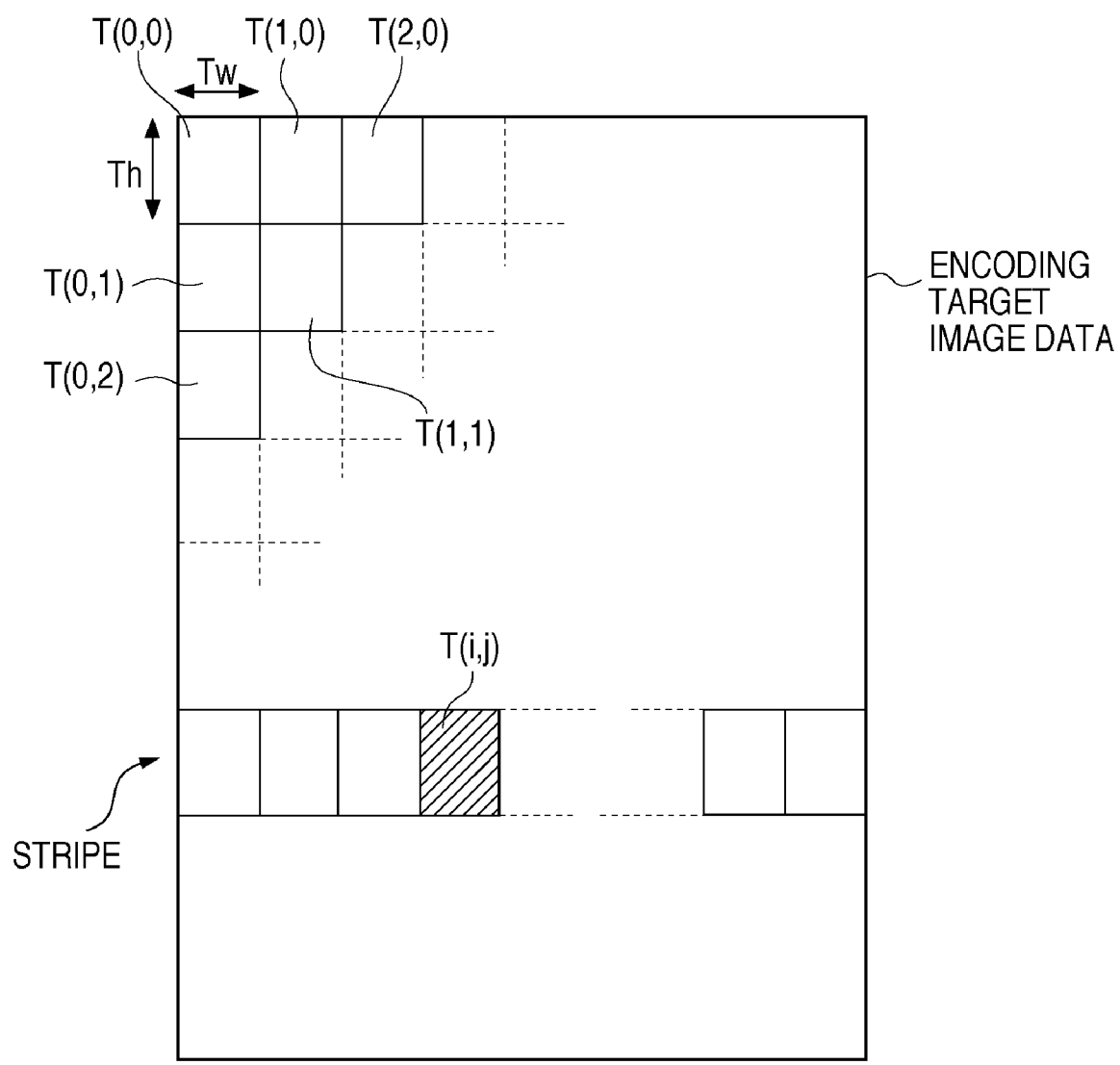
FIG. 8 is a view showing the relationship between encoding target image data, stripes, and tiles.

FIG. 8 shows the relationship between encoding target image data, stripes, and tiles. As shown in FIG. 8, a tile corresponding to the ith in the horizontal direction and the jth in the vertical direction in the image will be expressed as T(i,j).

The tile buffer 104 has an area to store image data of one tile and sequentially stores the tile data output from the tile divider 103. The capacity required by the tile buffer 104 is Tw×Th×3 (corresponding to RGB) bytes.

A resolution converter 105, which corresponds to the foregoing reduced image generator, performs sub-sampling of the tile data stored in the tile buffer 104 to extract one pixel from a 2×2 pixel region, thereby generating a ½ reduced tile. The ½ reduced tile represents a tile whose numbers of horizontal and vertical pixels are ½ those of the tile data stored in the tile buffer 104. The image data in the 2×2 pixel region will simply be referred to as a pixel block hereinafter.

Figure 3:
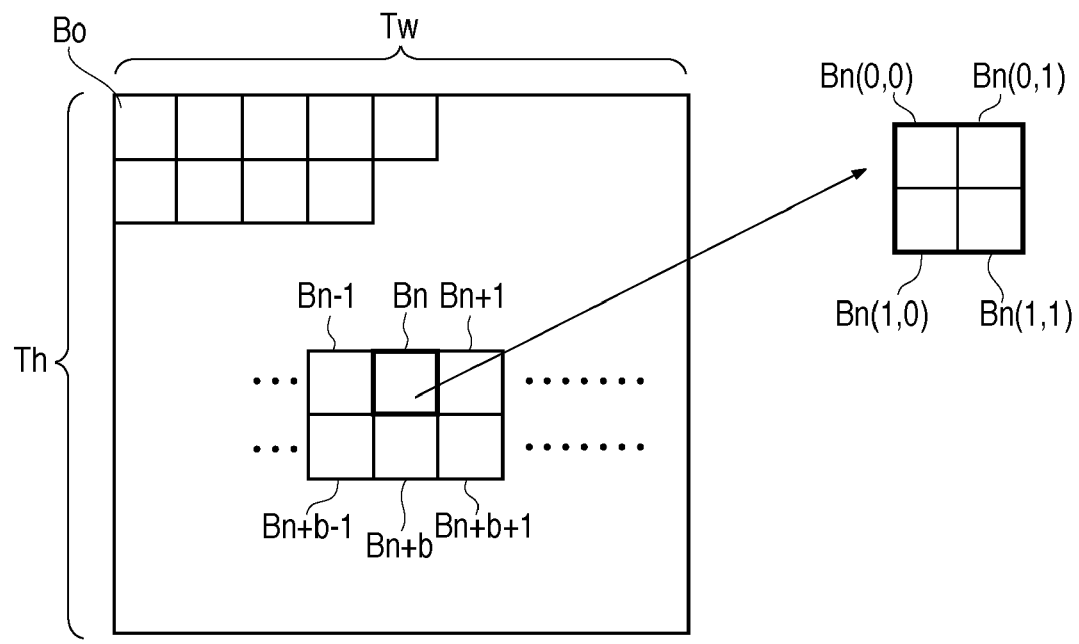
FIG. 3 is a view showing the relationship between tile data and a pixel block.

FIG. 3 illustrates the relationship between tile data and a pixel block $B_n$ of 2×2 pixels. Four pixels of the pixel block $B_n$ of interest are represented by $B_n(0,0)$, $B_n(0,1)$, $B_n(1,0)$, and $B_n(1,1)$, as shown in FIG. 3. The pixel block before (on the left side of) the block $B_n$ of interest is $B_{n-1}$, the pixel block next to (on the right side of) the block $B_n$ is $B_{n+1}$, and the pixel block under the block $B_n$ is $B_{n+b}$. In this case, "b" is the number of horizontal block in a tile, and b=Tw/2 where Tw is the number of horizontal pixels of a tile. In the embodiment, since Tw=32, b=16.

The resolution converter 105 of this embodiment extracts the pixel $B_n(0,0)$ at the upper left corner of the pixel block $B_n$ of interest as one pixel of the ½ reduced tile. The sub-sampling is performed for all pixel blocks $B_0$ to $B_m$ (m=Tw/2× Th/2−1=16×16−1=255) in the tile data to generate a ½ reduced tile including pixels ½ those of the original tile both horizontally and vertically. The resolution converter 105 stores the generated ½ reduced tile data in a ½ reduced tile buffer 106. In this embodiment, the resolution converter 105 therefore functions as a reduced image generator which generates a reduced image having W×H/4 pixels from original image data having W×H pixels.

An interpolation data generator 110, which corresponds to the foregoing interpolation information generator, generates information necessary for restoring the original tile data from the ½ reduced tile. More specifically, the interpolation data generator 110 generates interpolation data indicating how to interpolate the three non-sampling target pixels $B_n(0,1)$, $B_n(1,0)$, and $B_n(1,1)$ in the pixel block other than the subsampling target pixel $B_n(0,0)$.

FIG. 12 is a block diagram showing the internal arrangement of the interpolation data generator 110 according to this embodiment. The interpolation data generator 110 includes a flat determiner 1201 and a non-flat block analyzer 1202.

The flat determiner 1201 performs "flat determination" to determine whether image data of a tile can be restored by simple enlargement (pixel repeat) processing of the pixels of reduced tile data. The minimum unit of flat determination is a pixel block of 2×2 pixels. If a pixel block is reproducible by simple enlargement, that pixel block will be referred to as a flat block hereinafter. Otherwise, the block will be referred to as a non-flat block. In FIG. 3, the pixel block $B_n$, of interest is a flat block when $$B_n(0,0)=B_n(0,1)=B_n(1,0)=B_n(1,1) \quad (1)$$

holds.

Figure 13:
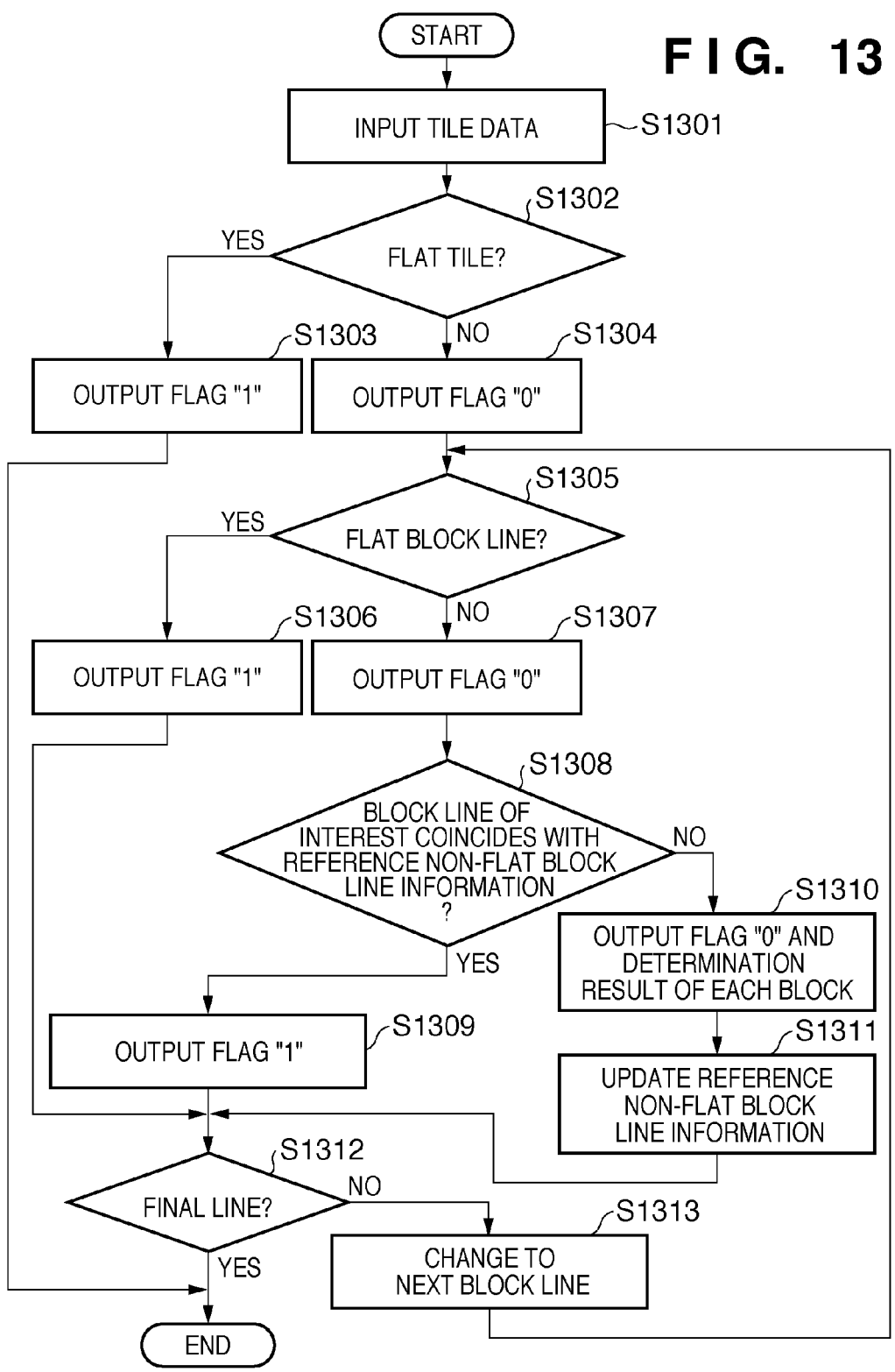
FIG. 13 is a flowchart illustrating the processing procedure of a flat determiner.

The flat determiner 1201 has a function of generating, for each pixel block of a tile, information indicating whether it is a flat block or a non-flat block. The processing procedure of the flat determiner 1201 will be described below with reference to the flowchart in FIG. 13. Note that FIG. 13 illustrates processing of one tile.

Terms will be explained. If all pixel blocks included in a tile are flat blocks, that tile will be referred to as a flat tile. Otherwise, the tile will be referred to as a non-flat tile. A group of Tw/2 (16 in this embodiment) pixel blocks which continue horizontally in a tile will be referred to as a block line. If all pixel blocks in a block line are flat blocks, that block line will be referred to as a flat block line. A block line including at least one non-flat block will be referred to as a non-flat block line.

First, the flat determiner 1201 receives tile data of Tw×Th pixels (step S1301). The tiles are independently processed. When referring to a pixel (neighboring pixel) outside a tile, the value of each color component is assumed to be "255".

In step S1302, the flat determiner 1201 performs flat/non-flat determination for all pixel blocks each including 2×2 pixels in the tile of Tw×Th pixels. More specifically, the flat determiner 1201 determines whether a tile of interest is a flat tile. Upon determining that the tile of interest is a flat tile, the flat determiner 1201 advances the process to step S1303 to output a 1-bit flag "1" to the non-flat block analyzer 1202, and ends the processing.

On the other hand, if the tile of interest includes at least one non-flat block (NO in step S1302), the flat determiner 1201 advances the process to step S1304 to output a 1-bit flag "0" to the non-flat block analyzer 1202. Then, the process advances to step S1305.

In step S1305, focusing on one block line formed from b (=Tw/2=16) pixel blocks which continue in the horizontal direction, the flat determiner 1201 determines whether the block line is a flat block line or a non-flat block line, as in step S1302. If it is a flat block line (YES), the flat determiner 1201 advances the process to step S1306 to output a 1-bit flag "1" to the non-flat block analyzer 1202. Upon determining that the block line of interest is a non-flat block line (NO in step S1305), the flat determiner 1201 advances the process to step S1307 to output a 1-bit flag "0" to the non-flat block analyzer 1202. Then, the process advances to step S1308.

The process reaches step S1308 when the block line of interest includes at least one non-flat block. For this reason, a flag indicating a flat/non-flat block determination result is necessary for each of the b (=Tw/2=16) blocks of the block line of interest. A 1-bit flag suffices for a block, which is "1" for a flat block and "0" for a non-flat block. In this embodiment, since a block line includes b (=16) pixel blocks, the flag sequence of a non-flat block line is formed from b flags, i.e., 16 bits.

In step S1308, the flat determiner 1201 compares the flag sequence of the block line of interest with that of a preceding non-flat block line and determines whether the flag sequences coincide with each other. Note that no preceding block line exists if the block line of interest is the first block line of the tile of interest. The flat determiner 1201 prepares, in the internal memory in advance, information indicating that all blocks of a block line are non-flat blocks before determining the block lines of the tile of interest. More specifically, defining a flat block as "1" and a non-flat block as "0", b bits "0" are prepared as an initial value. The b-bit data will be referred to as "reference non-flat block line information" hereinafter. The "reference non-flat block line information" is prepared in a decoding apparatus to be described later as well for restoration of one tile.

Hence, in step S1308, the flat determiner 1201 determines whether the sequence of the flat/non-flat block determination results of the blocks in the block line of interest coincides with the reference non-flat block line information.

Figures 10, 11:
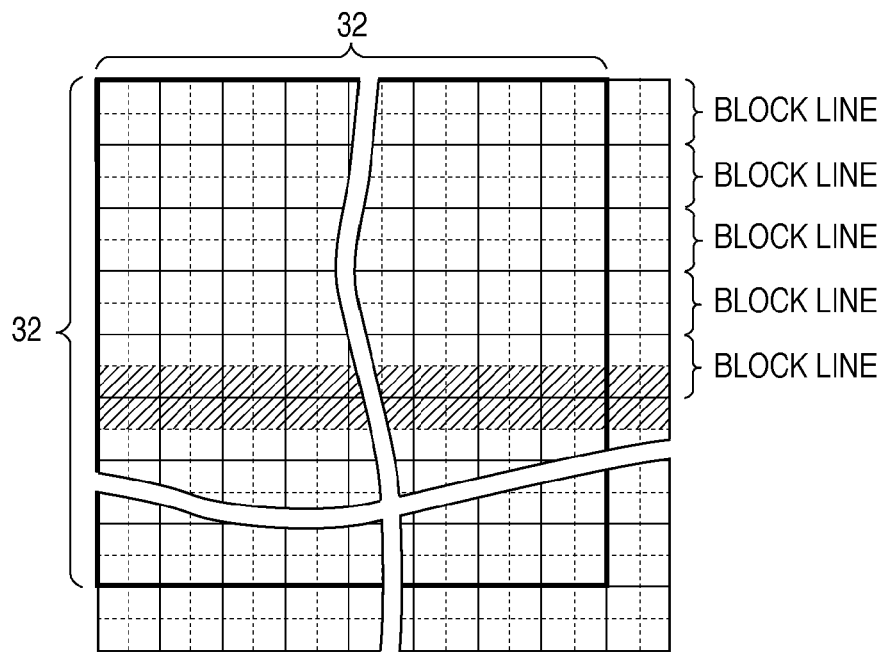
FIG. 10 is a view showing an example of tile data.
FIG. 11 is a view showing an example of a flat/non-flat block determination result.

The determination processing in step S1308 will be described here using an example of tile data shown in FIG. 10. In this tile data, the first to fourth block lines are flat block lines, and the fifth block line is a non-flat block line. FIG. 11 shows the flat/non-flat determination results of pixel blocks corresponding to the tile shown in FIG. 10.

Assume that the fifth block line is the block line of interest now. Since the block line of interest is the fifth block line, it is determined as the first non-flat block line of the tile of interest. The determination result of the pixel blocks included in the block line of interest and the reference non-flat block line information (16-bit data "000 . . . 000") are compared and determined to coincide.

Upon determining the determination result of the block line of interest coincides with the reference non-flat block line information, in step S1309, the flat determiner 1201 outputs, to the non-flat block analyzer 1202, a 1-bit flag "1" indicating that the determination results of the blocks of the block line of interest coincide with the reference non-flat block line information. In this case, the b (=Tw/2) bit flags indicating the flat/non-flat determination results of the respective blocks need not be output.

On the other hand, if the flag sequence indicating the flat/non-flat determination results of the block line of interest does not coincide with the reference non-flat block line information (NO in step S1308), the process advances to step S1310. The flat determiner 1201 first outputs a 1-bit flag "0" to the non-flat block analyzer 1202. Subsequently, the flat determiner 1201 outputs a flag sequence (b bits) indicating the flat/non-flat determination results of the block line of interest to the non-flat block analyzer 1202. After that, in step S1311, the flat determiner 1201 updates the reference non-flat block line information to the flat/non-flat determination results (b bits) of the block line of interest.

When the flat/non-flat determination has finished for the block line of interest, the process advances to step S1312 to determine whether the block line of interest is the final block line of the tile of interest. If the block line of interest is not the final block line (NO), the block line of interest changes to the next block line (step S1313). Then, the process returns to step S1305 to repeat the same process as described above. If the block line of interest is the final block line (YES), the flat determination processing of the tile data ends.

The flat determiner 1201 performs the above-described processing for the tile data of interest and outputs the flat/non-flat determination result to the non-flat block analyzer 1202.

The processing of the non-flat block analyzer 1202 will be explained next.

Like the flat determiner 1201, the non-flat block analyzer 1202 incorporates a b-bit register and, at the start of processing of one tile, sets, in the register, "reference non-flat block line information" indicating that all blocks of one block line are non-flat blocks. While analyzing the determination result from the flat determiner 1201, the non-flat block analyzer 1202 directly passes and outputs it to an interpolation data buffer 112. At this time, upon determining that there is a block line for which the 1-bit flag "0" has been output in step S1310 of FIG. 13, the non-flat block analyzer 1202 updates the reference non-flat block line information to the succeeding flat/non-flat determination results of the blocks. If the block line of interest has undergone the process in step S1309 of FIG. 13, which block is a non-flat block can be determined by referring to the reference non-flat block line. If it is determined that the block line of interest has undergone the process in step S1310 of FIG. 13, whether a block is a non-flat block can be determined by checking the b-bit values following the 1-bit flag "0" at the top. That is, the non-flat block analyzer 1202 can determine the number and positions of all non-flat blocks in the tile of interest. For a pixel block (non-flat block) formed from 2×2 pixels which are not reproducible by simply enlarging the pixels of the reduced tile, the non-flat block analyzer 1202 analyzes the number of colors and their arrangement in the pixel block, and generates and outputs additional information. More specifically, the non-flat block analyzer 1202 receives the flat/non-flat determination result output from the flat determiner 1201, performs analysis of a non-flat block, and generates and outputs information to restore the non-flat block.

Figure 15:
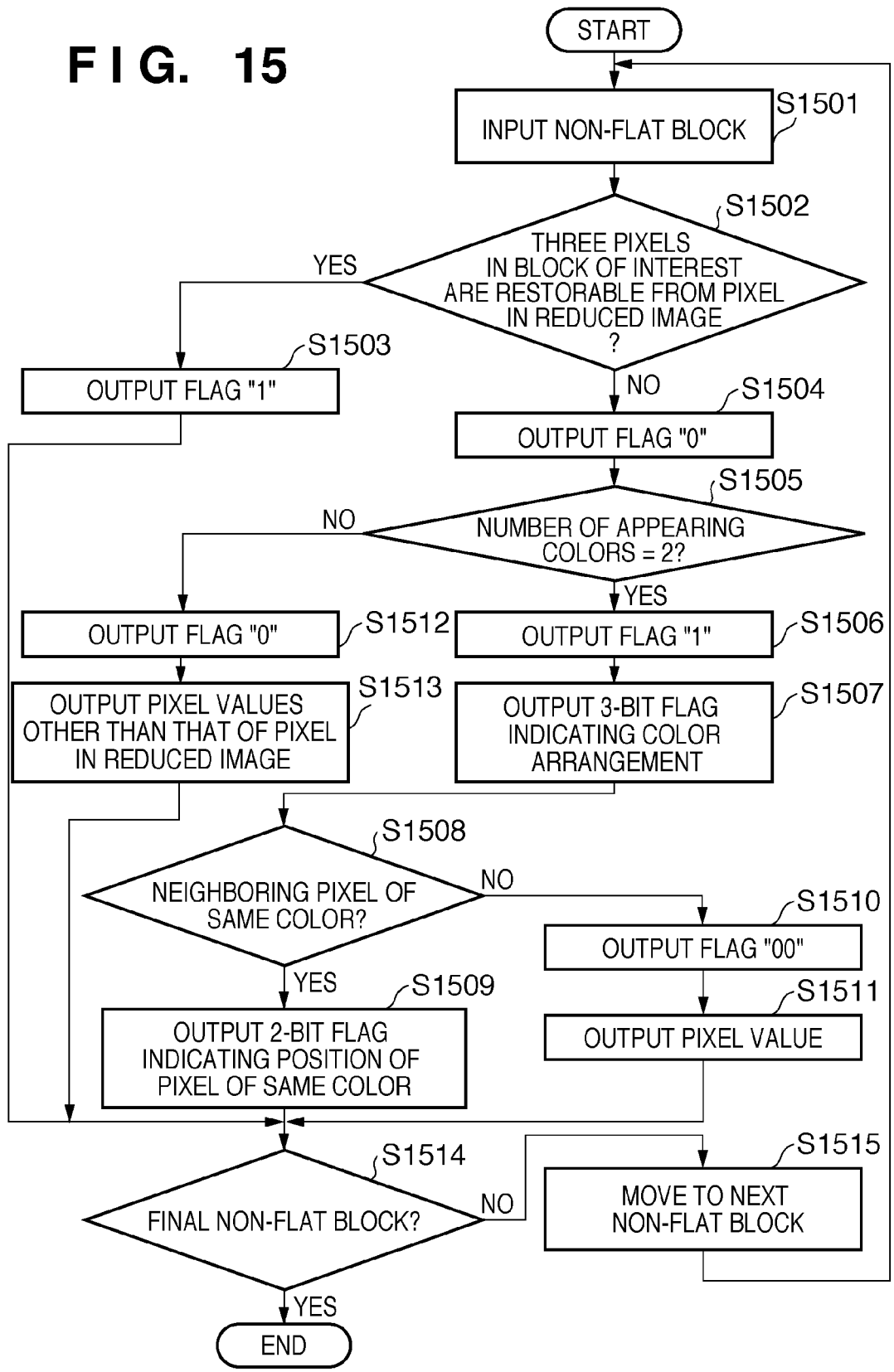
FIG. 15 is a flowchart illustrating the processing procedure of a non-flat block analyzer.

For a block determined to be a non-flat block, the non-flat block analyzer 1202 performs non-flat block encoding processing according to the flowchart in FIG. 15. The processing of the non-flat block analyzer 1202 will be described below with reference to FIG. 15.

First, in step S1501, defining one non-flat block $B_n$ as the block of interest, the non-flat block analyzer 1202 receives pixel block data of 2×2 pixels. In step S1502, the non-flat block analyzer 1202 determines whether the pixel block $B_n$ of interest satisfies $B_n(0,1)=B_{n+1}(0,0)$, and $B_n(1,0)=B_{n+1}(0,0)$, and $B_n(1,1)=B_{n+b+1}(0,0)$      (2)

The block $B_n$ that satisfies equations (2) will be defined as a three-neighboring-pixel coincidence block hereinafter.

There is a reason to determine the coincidence/incoincidence of the pairs $\{B_n(0,1), B_{n+1}(0,0)\}$, $\{B_n(1,0), B_{n+b}(0,0)\}$, and $\{B_n(1,1), B_{n+b+1}(0,0)\}$, as indicated by equations (2).

In general, a pixel of interest and pixels adjacent to it have high correlations, and this applies to many images. Hence, to predict the pixel value of a pixel of interest, adjacent pixels are often used as reference pixels for prediction. Experiments have revealed that under a condition that the four pixels of a block of interest are not identical, i.e., the block of interest is not a flat block, the pixels of each of the pairs $\{B_n(0,1), B_{n+1}(0,0)\}$, $\{B_n(1,0), B_{n+b}(0,0)\}$, and $\{B_n(1,1), B_{n+b+1}(0,0)\}$ coincide at high probability.

For this reason, the coincidence between $B_n(0,1)$ and $B_{n+1}(0,0)$ is determined. The remaining pairs $\{B_n(1,0), B_{n+b}(0,0)\}$ and $\{B_n(1,1), B_{n+b+1}(0,0)\}$ are compared due to the same reason. If equations (2) described above are satisfied (if the pixels of the three pairs are identical to each other), a short code word is assigned to decrease the information amount.

Note that in this embodiment, a reduced image is generated by sub-sampling the pixel at the upper left corner of each pixel block. Hence, note that the pixels $B_{n+1}(0,0)$, $B_{n+b}(0,0)$, and $B_{n+b+1}(0,0)$ of equations (2) are also the sub-sampling target pixels of three pixel blocks adjacent to the pixel block $B_n$ of interest.

If the block $B_n$ of interest satisfies equations (2), it can be determined that the three pixels non-sampling target pixels $B_n(0,1)$, $B_n(1,0)$, and $B_n(1,1)$ are reproducible from neighboring pixels. However, if the block is located at the right or lower end of the image, it is impossible to refer to pixels outside the block. To cope with this, an arbitrary value is set in advance virtually for the components of external pixels, and coincidence/incoincidence to the pixel value is determined. In this embodiment, "255" is virtually set as each component value. However, any value other than "255" is usable if the encoding and decoding sides should use the same value.

Figure 4:
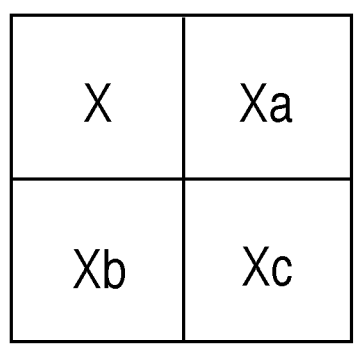
FIG. 4 is a view showing the positions of a sampling target pixel X and non-sampling target pixels Xa, Xb, and Xc in a pixel block.

FIG. 4 shows a pixel block of interest including 2×2 pixels. A pixel X in FIG. 4 indicates a pixel sub-sampled for reduced image generation and corresponds to the pixel $B_n(0,0)$ in the block $B_n$ of interest. Pixels Xa, Xb, and Xc indicate the pixels $B_n(0,1)$, $B_n(1,0)$, and $B_n(1,1)$ in the block $B_n$ of interest, respectively. A description will be made below using the pixels X, Xa, Xb, and Xc.

If it is determined in step S1502 that equations (2) hold, the pixels Xa, Xb, and Xc of the block $B_n$ of interest can directly be reproduced from the pixels of the reduced image. Hence, the process advances to step S1503 to output a 1-bit flag "1" indicating that the pixels are reproducible.

On the other hand, if it is determined that the block of interest does not satisfy equations (2), the process advances to step S1504 to output a 1-bit flag "0".

The process advances to step S1505 to determine whether the number of colors included in the block of interest is "2" or more (three or four). Note that the number of colors is never "1" because the block of interest is a non-flat block.

If it is determined that the number of colors included in the block of interest is larger than "2" (i.e., three or four), the non-flat block analyzer 1202 outputs a 1-bit flag "0" in step S1512. In step S1513, the non-flat block analyzer 1202 outputs the pixel data of the three pixels Xa, Xb, and Xc that are not used in the reduced image. In this embodiment, since one pixel has three, R, G, and B components, and one component is formed from eight bits, the total number of bits of the three pixels Xa, Xb, and Xc is 3×8×3=72 bits.

On the other hand, upon determining that the number of colors included in the block of interest is "2", the non-flat block analyzer 1202 outputs a 1-bit flag "1" indicating that the number of appearing colors is "2" in step S1506. Then in step S1507, the non-flat block analyzer 1202 outputs pixel arrangement information indicating which one of patterns 1601 to 1607 shown in FIG. 16 corresponds to the three pixels Xa, Xb, and Xc of the block of interest in FIG. 4 except for the pixel X used in the reduced image. As shown in FIG. 16, the total number of patterns is seven. Hence, 3-bit pixel arrangement information can specify one pattern. In the embodiment, however, a pixel of the same color as that of the pixel used in the reduced image is represented by "1", and a pixel of a different color is represented by "0". Bits corresponding to the pixels Xa, Xb, and Xc in FIG. 4 are output in this order (3 bits in this case as well). For example, the pixels Xa, Xb, and Xc which coincide with the pattern 1601 in FIG. 16 have colors identical to each other but different from the color of the pixel used in the reduced image. Hence, the three bits of pixel arrangement information are "000". The three bits are "100" for the pattern 1602, "010" for the pattern 1603, and "001" for the pattern 1604. A description of the rest will be omitted.

Next, in step S1508, the non-flat block analyzer 1202 determines whether there is a neighboring pixel having the same color as that of one of the pixels Xa, Xb, and Xc of the block of interest other than the pixel X used in the reduced image, which has a color different from that of the pixel X. In this embodiment, the neighboring pixels to be compared are the pixel $B_{n+1}$ (0,0) of the block $B_{n+1}$ adjacent on the right side of the block of interest, the pixel $B_{n+b}$(0,0) of the block $B_{n+b}$ immediately below the block of interest, and the pixel $B_{n+b+1}$ (0,0) of the block $B_{n+b+1}$ off to the lower right side of the block of interest. Comparison is done in this order. Since it is necessary to indicate which one of the three pixels coincides, the comparison result is represented by two bits. If the pixel $B_{n+1}$(0,0) coincides with the pixel $B_n$(0,0), a 2-bit flag "11" is output. If the pixel $B_{n+b}$(0,0) coincides with the pixel $B_n$(0,0), a 2-bit flag "01" is output. If the pixel $B_{n+b+1}$(0,0) coincides with the pixel $B_n$(0,0), a 2-bit flag "10" is output (step S1509).

If none of the three neighboring pixels coincides with the pixel of interest (NO), the process advances to step S1510 to output a 2-bit flag "00". Then, the non-flat block analyzer 1202 outputs the pixel value of the second color (step S1511) and ends the processing of the block $B_n$ of interest. In this embodiment, since the encoding target image is RGB data having eight bits per color, 24 bits are output in step S1511.

After the processing of the block $B_n$ of interest, the non-flat block analyzer 1202 determines in step S1514 whether the block of interest is the final non-flat block of the tile of interest. If NO in step S1514, the process advances to processing of the next non-flat block (step S1515). The non-flat block analyzer 1202 performs the process from step S1501 for the next non-flat block as well. Upon determining that the block of interest is the final non-flat block, the processing ends.

In the above-described way, the non-flat block analyzer 1202 outputs the flat/non-flat determination result and interpolation data generated based on the non-flat block analysis result. These data are stored in the interpolation data buffer 112.

Note that the pixel blocks each expressed by 2×2 pixels can be classified into five types (a) to (e), as is apparent from the above description.
(a) flat block
(b) non-flat block which is a three-neighboring-pixel coincidence block
(c) non-flat block whose number of appearing colors is "2" and whose neighboring pixels include a pixel of the same color as the second color (d) non-flat block whose number of appearing colors is "2" and whose neighboring pixels include no pixel of the same color as the second color
(e) non-flat block whose number of appearing colors is larger than "2" (three or four)

During the above processing, the interpolation data generator 110 determines the type of each pixel block which corresponds to one of the types (a) to (e), and counts the number of blocks of each type. The numbers of blocks of the types (a) to (e) will be represented by Na, Nb, Nc, Nd, and Ne hereinafter.

Before interpolation data generation for one tile, the interpolation data generator 110 initializes the numbers Na to Ne of blocks to "0". When generation and output of interpolation data of one tile have ended, the interpolation data generator 110 outputs the counted numbers Na to Ne of blocks to an encoding method selector 111.

In the embodiment, since one tile includes 32×32 pixels, 16×16 pixel blocks exist in it. If the interpolation data generator 110 has executed the process in step S1303 of FIG. 13, the tile of interest includes only flat blocks. Na=256, and the numbers Nb to Ne of blocks except Na are decided as "0". If the process in step S1306 has been executed, "16" is added to Na counted until that time. If the process in step S1503 of FIG. 15 has been executed, "1" is added to Na. If the process in step S1512 has been executed, "1" is added to Ne. Other cases can sufficiently be understood from the above description.

Based on the frequency distribution of the numbers Na to Ne of blocks counted by the interpolation data generator 110, the encoding method selector 111 decides the encoding method of the ½ reduced tile data stored in the ½ reduced tile buffer 106, and outputs the result to the lossy encoder 107, lossless encoder 108, and code stream generator 113 as a binary (1 bit) control signal. As a consequence, one of the lossy encoder 107 and the lossless encoder 108 encodes the ½ reduced tile data stored in the ½ reduced tile buffer 106. The generated encoded data is output to the code stream generator 113. In the embodiment, when the control signal from the encoding method selector 111 is "0", the lossy encoder 107 executes lossy encoding processing. When the control signal is "1", the lossless encoder 108 executes lossless encoding processing.

A character image, line image, clipart image, or the like generally tends to include many blocks of the types (a) to (c) described above. In other words, the values of the numbers Na to Nc are large in, e.g., a character image, line image, or clipart image. On the other hand, in a complex CG image, natural image, or the like, the values of the numbers Nd and Ne tend to be large. A character image, line image, clipart image, or the like tends to suffer noticeable image quality degradation in lossy encoding but be able to obtain higher compression performance in lossless encoding. On the other hand, a complex CG image, natural image, or the like conversely tends to have unnoticeable image quality degradation in lossy encoding but be unable to obtain high compression performance in lossless encoding.

The original images of the pixel blocks of the block types (a) to (c) are restored using the pixel values of the reduced image. Hence, if a pixel change (degradation) has occurred in the reduced image, the degradation is further enhanced when restoring the original resolution image in decoding. For this reason, the pixel blocks are easily affected by the image quality degradation in reduced image encoding.

To the contrary, for the pixel blocks of the block types (d) and (e), information of a pixel (color) that is not included in the reduced image is directly designated. Hence, the pixel blocks are rarely affected by the image quality degradation.

For the above-described reasons, when the values Na, Nb, and Nc are large, the encoding method selector 111 outputs a control signal "1" to apply lossless encoding to the ½ reduced tile data. When the values Nd and Ne are large, the encoding method selector 111 outputs a control signal "0" to apply lossy encoding to the ½ reduced tile.

More specifically, the encoding method selector 111 compares a preset threshold TH1 with the sum of Na, Nb, and Nc. If $$Na+Nb+Nc>TH1 \quad (3)$$

is satisfied, the encoding method selector 111 outputs the control signal "1". Otherwise the encoding method selector 111 outputs the control signal "0".

In place of inequality (3), $$Nd+Ne \leq TH1 \quad (4)$$

may be adopted. It should be understood that inequalities (3) and (4) are equivalent to each other.

Note that the threshold TH1 can be set by the user as needed. Typically, a value ½ the number of blocks included in a tile is preferable. In the embodiment, one tile includes 16×16 pixel blocks. Hence, TH1=128.

If the encoding method selector 111 has output the control signal "0", the lossy encoder 107 encodes the ½ reduced tile data stored in the ½ reduced tile buffer 106 by lossy encoding to generate encoded data and stores the generated encoded data in an encoded data buffer 109.

Various methods are applicable as the lossy encoding processing of the lossy encoder 107. A JPEG (ITU-T T.81|ISO/IEC10918-1) baseline method recommended as an international standard method of still image encoding is applied here. The JPEG has been described in detail in recommendations and the like, and a description thereof will be omitted. A Huffman table and quantization table to be used for JPEG encoding are the same for all tiles. A frame header, scan header, various tables, and the like common to all tiles are not stored in the encoded data buffer 109. The encoded data buffer 109 stores only an encoded data portion. More specifically, out of the general JPEG baseline encoded data structure shown in FIG. 7, only an entropy encoded data segment from immediately after the scan header to immediately before the EOI marker is stored. For the descriptive convenience, a restart interval by DRI and RST markers and the number of lines by a DNL marker are not defined.

If the encoding method selector 111 has output the control signal "1", the lossless encoder 108 encodes the ½ reduced tile data stored in the ½ reduced tile buffer 106 by lossless encoding to generate encoded data. The lossless encoder 108 stores the generated encoded data in the encoded data buffer 109. The lossless encoder 108 can execute various kinds of lossless encoding. For example, JPEG-LS (ITU-T T.87|ISO/IEC14495-1) recommended as an international standard method by ISO and ITU-T is used here. However, any other lossless encoding method such as a JPEG (ITU-T T.81|ISO/IEC10918-1) lossless mode is also usable. The JPEG-LS has also been described in detail in recommendations and the like, and a description thereof will be omitted. Like JPEG, a header and the like are not stored in the buffer, and only an encoded data portion is stored.

The code stream generator 113 concatenates the control signal output from the encoding method selector 111, the interpolation data stored in the interpolation data buffer 112, and the ½ reduced tile encoded data stored in the encoded data buffer 109, and adds necessary additional information, thereby generating a code stream to be output from the image encoding apparatus as encoded image data corresponding to the original image data. At this time, the code stream generator 113 also adds and outputs information indicating which tile has undergone lossless encoding and which tile has undergone lossy encoding, based on the control signal output from the encoding method selector 111.

FIG. 9A is a view showing the data structure of an output code stream of the image encoding apparatus. Information necessary for decoding an image, e.g., additional information including the numbers of horizontal and vertical pixels of the image, the number of components, the number of bits of each component, and the width and height of a tile is attached to the top of the output code stream as a header. The header portion includes not only the information about the image itself but also information about encoding such as a Huffman table and a quantization table to be commonly used for tiles. FIG. 9B is a view showing the structure of an output code stream of each tile. A tile header containing various kinds of information necessary for decoding such as the number and size of a tile is attached to the top of each tile. A control signal output from the encoding method selector 111 follows the tile header. The control signal is separated from the tile header for the sake of description but may be included in the tile header. Note that although not specifically illustrated in FIGS. 9A and 9B, the length of the code stream of each tile may be managed by, e.g., including it in the header portion at the top of the tile or encoded data so as to enable random access for each tile. The same effect can be obtained by, e.g., setting a special marker with a twist not to generate a predetermined value in the encoded data and placing the marker at the top or end of each tile data.

A code output unit 114 outputs the output code stream generated by the code stream generator 113 outside the apparatus. If the output target is a storage device, the code stream is output as a file.

As described above, the image encoding apparatus of this embodiment performs encoding processing for each tile (a size of 32×32 pixels in the embodiment) formed from a plurality of pixels. The apparatus generates, for each tile, a reduced image and interpolation data to restore the original image based on the reduced image and encodes the reduced image by lossless encoding or lossy encoding. Interpolation data generation is simple and easy processing. Bitmap encoding processing (encoding processing by the lossy encoder 107 or the lossless encoder 108) that requires sophisticated calculation processing is performed for only the reduced image. This implements easy and quick encoding processing as compared to bitmap-encoding a whole image. One of lossless encoding and lossy encoding is selectively applied to encode the reduced image. Based on the structure of interpolation data, if the influence of lossy encoding on image quality is large, lossless encoding is applied. This allows prevention of any spread of image quality degradation when restoring the original resolution in decoding.

[Modification of First Embodiment]

An example in which a computer program implements the same processing as in the first embodiment will be explained below as a modification of the first embodiment.

Figure 14:
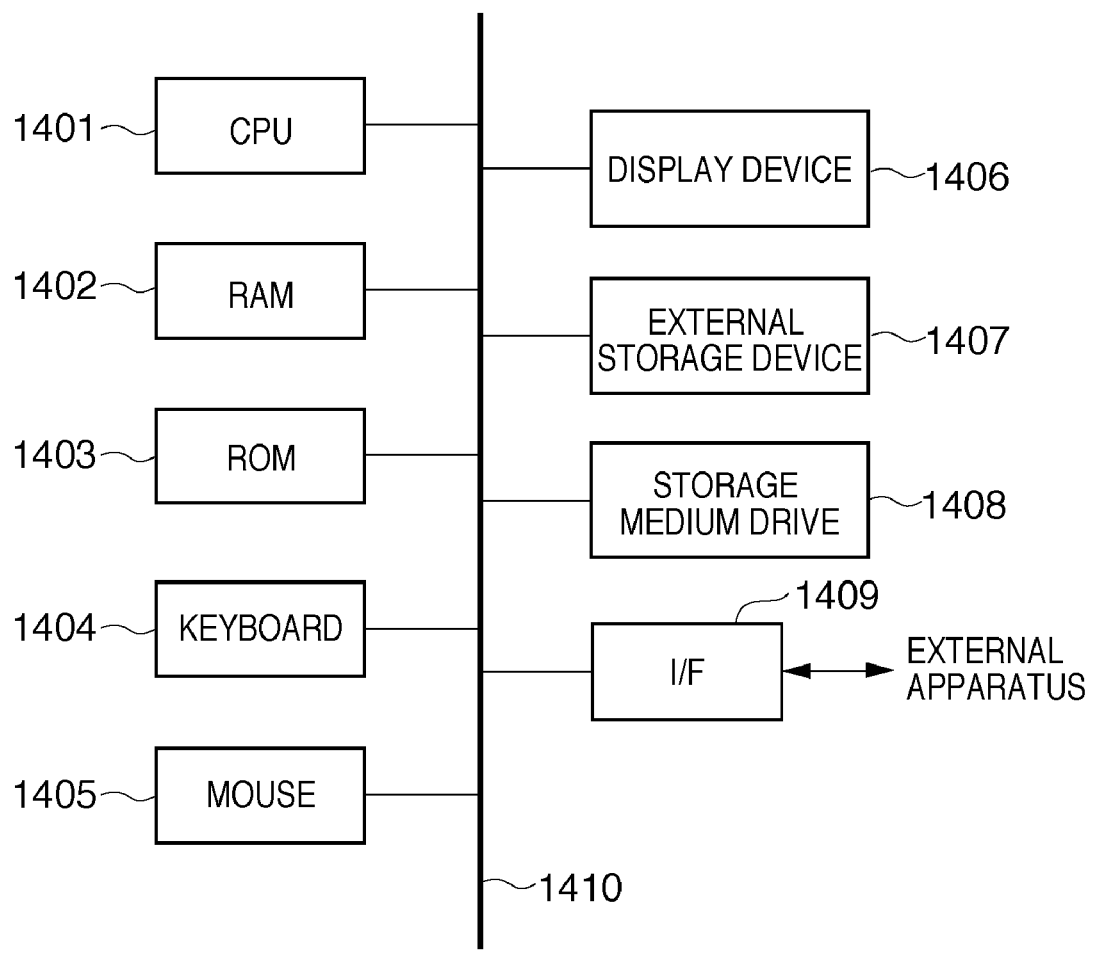
FIG. 14 is a block diagram of an information processing apparatus according to the modification of the first embodiment.

FIG. 14 is a block diagram of an information processing apparatus (e.g., personal computer) according to the modification.

Referring to FIG. 14, a CPU 1401 controls the overall apparatus using programs and data stored in a RAM 1402 and a ROM 1403 and also executes image encoding processing and decoding processing to be described later. The RAM 1402 has an area to store programs and data downloaded from an external storage device 1407 or a storage medium drive 1408 or from an external apparatus via an I/F 1409. The RAM 1402 also has a work area to be used by the CPU 1401 to execute various kinds of processing. The ROM 1403 stores a boot program and the setting programs and data of the apparatus. A keyboard 1404 and a mouse 1405 can input various instructions to the CPU 1401.

A display device 1406 is formed from, e.g., a CRT or a liquid crystal screen and can display information such as an image or a text. The external storage device 1407 is a mass storage such as a hard disk drive. The external storage device 1407 stores, as files, an OS (operating system), programs for image encoding and decoding processing to be described later, encoding target image data, encoded data of decoding target images, and the like. The CPU 1401 loads the programs and data to a predetermined area on the RAM 1402 and executes them.

The storage medium drive 1408 reads out programs and data from a storage medium such as a CD-ROM or a DVD-ROM and outputs them to the RAM 1402 or the external storage device 1407. Note that the storage medium may store programs for image encoding and decoding processing to be described later, encoding target image data, encoded data of decoding target images, and the like. In this case, the storage medium drive 1408 loads the programs and data to a predetermined area on the RAM 1402 under the control of the CPU 1401.

The I/F 1409 connects an external apparatus to this apparatus to enable data communication between them. For example, encoding target image data or encoded data of a decoding target image can be input to the RAM 1402, the external storage device 1407, or the storage medium drive 1408 of the apparatus. A bus 1410 connects the above-described units.

In the above arrangement, when the apparatus is powered on, the CPU 1401 loads the OS from the external storage device 1407 to the RAM 1402 in accordance with the boot program in the ROM 1403. This enables input from the keyboard 1404 or the mouse 1405 and allows the display device 1406 to display a GUI. When the user operates the keyboard 1404 or the mouse 1405 and inputs an instruction to activate an image encoding processing application program stored in the external storage device 1407, the CPU 1401 loads the program to the RAM 1402 and executes it. This makes the apparatus function as an image encoding apparatus.

The processing procedure of an application program for image encoding to be executed by the CPU 1401 will be described below with reference to the flowchart in FIG. 2. Fundamentally, this program includes functions (or subroutines) corresponding to the constituent elements shown in FIG. 1. However, areas such as the line buffer 102, tile buffer 104, ½ reduced tile buffer 106, encoded data buffer 109, and interpolation data buffer 112 in FIG. 1 are allocated in the RAM 1402 in advance.

First, in step S200, the CPU executes initialization processing before the start of encoding. In this case, the CPU prepares header information to be included in the code stream of encoding target image data and initializes various memories and variables.

After the initialization processing, in step S201, the CPU sequentially inputs encoding target image data from an external apparatus connected via the I/F 1409, and the RAM 1402 stores data of one stripe of the encoding target image data (corresponding to the processing of the image input unit 101).

In step S202, the CPU extracts tile data of interest from the stripe stored in the RAM 1402 and stores the tile data at another address position in the RAM 1402 (corresponding to the processing of the tile divider 103).

In step S203, the CPU sub-samples the pixel at the upper left corner of each pixel block of the tile data of interest to generate ½ reduced tile data and stores it in the RAM 1402 (corresponding to the processing of the resolution converter 105).

In step S204, the CPU generates interpolation data to be used to restore tile data having the original resolution from the ½ reduced tile data (corresponding to the processing of the interpolation data generator 110).

In step S205, the CPU decides, based on the interpolation data structure information, which one of the lossless encoding method and the lossy encoding method should be used for the ½ reduced tile data (corresponding to the processing of the encoding method selector 111).

If lossless encoding is selected (YES in step S206), the CPU performs lossless encoding of the ½ reduced tile data in step S207 to generate encoded data and stores it in the RAM 1402 (corresponding to the processing of the lossless encoder 108).

If lossy encoding is selected (NO in step S206), the CPU performs lossy encoding of the ½ reduced tile data in step S208 to generate encoded data and stores it in the RAM 1402 (corresponding to the processing of the lossy encoder 107).

In step S209, the CPU concatenates, for the tile of interest, a tile header, lossless/lossy identification information, interpolation data, and the encoded data of the ½ reduced tile data, thereby generating encoded tile data (corresponding to the processing of the code stream generator 113).

In step S210, the CPU determines whether the encoded tile is the last tile of the stripe that is being read currently. If it is not the last tile, the CPU repeats the process from step S202 for the next tile. If it is the last tile of the stripe, the process advances to step S211.

In step S211, the CPU determines whether the stripe that is being read currently is the last stripe of the image. If it is not the last stripe, the process returns to step S201 to read the next stripe data and continue the processing. If it is the last stripe, the process advances to step S212.

When the process advances to step S212, the encoding processing has finished for all tiles of the encoding target image data. The CPU generates final encoded data from the encoded data of all tiles stored in the RAM 1402 and outputs it to an external apparatus via the I/F 1409 (corresponding to the processes of the code stream generator 113 and the code output unit 114).

As is apparent from the above description, the modification can provide the same functions and effects as in the first embodiment. That is, an encoding target image data is decomposed to a reduced image and interpolation data. Lossless encoding or lossy encoding is selectively applied to the reduced image based on the structure of the interpolation data, thereby encoding a high-resolution image at a high speed.

Figure 2:
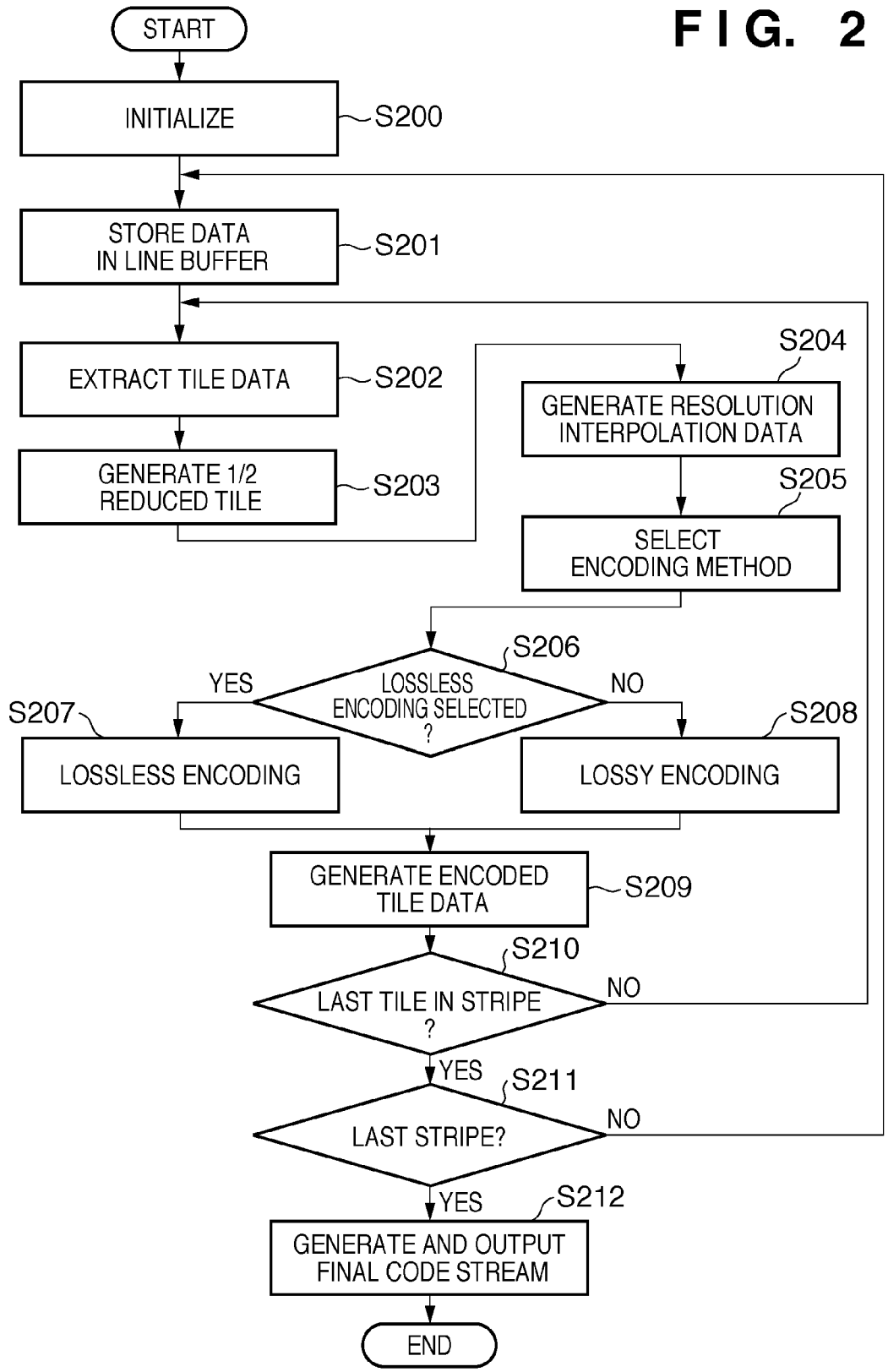
FIG. 2 is a flowchart illustrating the procedure of processing according to a modification of the first embodiment.

Note that the process order of the processing procedure is not necessarily limited to that shown in FIG. 2. For example, in the process of generating ½ reduced tile data (step S203), the process of generating resolution interpolation data (step S204), the process of selecting the encoding method (step S205), and the like, interpolation information generation may be executed first. Alternatively, the processes may be integrated.

[Second Embodiment]

In the first embodiment and its modification, which one of lossless encoding and lossy encoding should be applied to the reduced image is decided based on the distribution of interpolation methods to be applied to restore the original resolution image using resolution interpolation data. However, the same effect can be obtained by estimating the interpolation method distribution from, e.g., the code amount of resolution interpolation data and deciding, based on the estimation result, which one of lossless encoding and lossy encoding should be executed.

A method of selecting an encoding method based on the code amount of resolution interpolation data will be explained as the second embodiment.

Note that in the second embodiment as well, target image data is image data including RGB components each formed from eight bits. The embodiment is also applicable to image data of any other form such as CMYK image data. An image includes W horizontal pixels×H vertical pixels. Tile sizes Tw and Th are "32", as in the first embodiment.

An image encoding apparatus according to the second embodiment is not newly illustrated because it basically has the same arrangement as in the block diagram of FIG. 1 except that the process contents of an interpolation data generator 110 and an encoding method selector 111 are different from those of the first embodiment.

As the processing of the second embodiment, the process contents of the interpolation data generator 110 and the encoding method selector 111 whose operations are different from the first embodiment will be explained below.

In the above-described first embodiment, the numbers Na to Ne of blocks indicating the frequency distribution of pixel block types in a tile are calculated in the process of interpolation data generation by the interpolation data generator 110 and provided to the encoding method selector 111. In the second embodiment, however, the interpolation data generator 110 calculates not the frequency distribution but a code amount L of interpolation data of a tile of interest and provides it to the encoding method selector 111.

The encoding method selector 111 compares the interpolation data code amount L provided from the interpolation data generator 110 with a predetermined threshold TH2.

If L<TH2, the encoding method selector 111 outputs a control signal "1" to apply lossless encoding. If L≧TH2, the encoding method selector 111 outputs a control signal "0" to apply lossy encoding. Since one tile includes 32×32 pixels, its data amount is 32×32×3 (the number of RGB components) =3072 bytes. In the second embodiment, the threshold TH2 is set to ⅛ of 3,072 bytes (=384 bytes).

The five types (a) to (e) of pixel blocks each including 2×2 pixels, which have been described in association with the encoding method selector 111 of the first embodiment, will be examined. As is apparent from the above explanation, in the types (a) to (c) which frequently appear in a character image, line image, clipart image, or the like, the code length output as interpolation data is short. On the other hand, in the types (d) and (e) which are often observed in a complex CG image, natural image, or the like, the code length is long because color information is directly included in interpolation data. In other words, when a tile of interest includes many blocks of the types (a) to (c), the code amount of the interpolation data of the tile of interest is small. Conversely, when a tile of interest includes many blocks of the types (d) and (e), the code amount of the interpolation data is large. Hence, the same effect as in referring to the frequency in the first embodiment can be obtained based on the code amount of interpolation data.

Note that a computer program can also implement the same processing as in the second embodiment, as is apparent from the above-described modification of the first embodiment, and a description thereof will not be repeated.

[Third Embodiment]

The image encoding apparatuses of the above-described first and second embodiments reduce the encoding target image data to ½ both horizontally and vertically and apply lossless or lossy encoding to it. However, the process need not always be ½ reduction. A smaller image may be generated as a bitmap encoding target. In the third embodiment, for example, the ½ reduction processing is recursively executed a predetermined number of times. An example will be described in which every time the reduction processing is executed once, interpolation information is generated from the reduction source image. For the descriptive convenience, the number of times of recursive processing is set to two.

Figure 5:
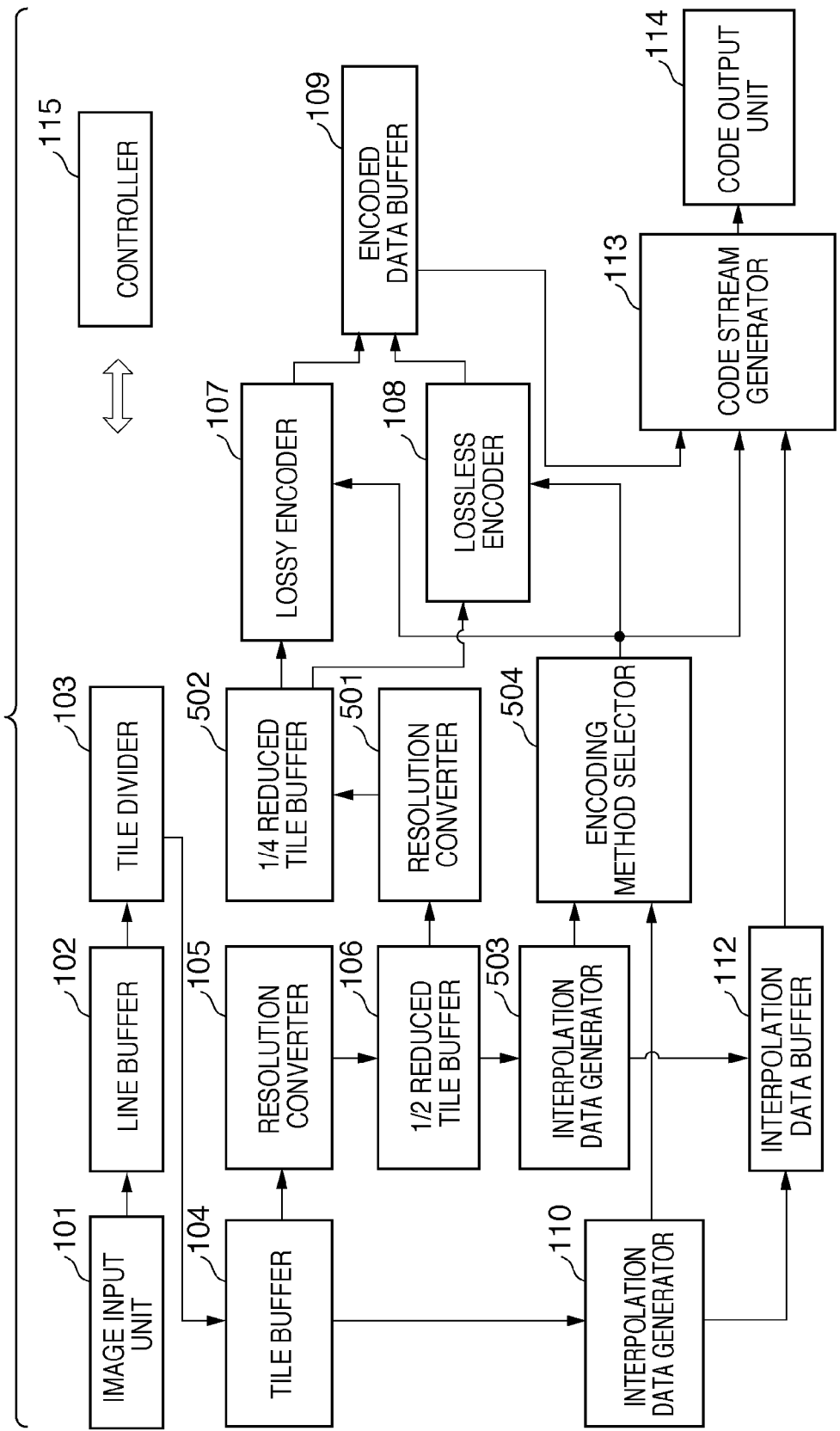
FIG. 5 is a block diagram of an image encoding apparatus according to the third embodiment.

FIG. 5 is a block diagram of an image encoding apparatus according to the third embodiment.

Unlike the block diagram of the first and second embodiments, a resolution converter 501, ¼ reduced tile buffer 502, and interpolation data generator 503 are added, and an encoding method selector 504 replaces the encoding method selector 111. The operation portions different from the second embodiment will be described below.

The resolution converter 501 performs the same process as that of a resolution converter 105 to further reduce ½ reduced tile data stored in a ½ reduced tile buffer 106 to ½ horizontally and vertically and stores it in the ¼ reduced tile buffer 502.

Based on the reduced tile data stored in the ¼ reduced tile buffer, the interpolation data generator 503 generates interpolation data necessary for restoring the ½ reduced tile data stored in the ½ reduced tile buffer. This process is the same as that performed by an interpolation data generator 110 for tile data stored in a tile buffer 104. To discriminate between the interpolation data generated by the interpolation data generator 110 and that generated by the interpolation data generator 503, the former will be referred to as level 1 interpolation data, and the latter as level 2 interpolation data hereinafter.

An interpolation data buffer 112 stores both the level 1 interpolation data and the level 2 interpolation data.

The interpolation data generators 110 and 503 provide a code amount L1 of the level 1 interpolation data and a code amount L2 of the level 2 interpolation data to the encoding method selector 504, respectively. The encoding method selector 504 compares the sum of the received code amounts L1 and L2 with a predetermined threshold TH3.

More specifically, if L1+L2<TH3, the encoding method selector 504 outputs a control signal "1" to apply lossless encoding. On the other hand, if L1+L2≧TH3, the encoding method selector 504 outputs a control signal "0" to apply lossy encoding. In the third embodiment, the threshold TH3 is set to ¼ the original tile data amount that is 3,072 bytes, i.e., "768" (bytes).

Figures 6, 7:
FIG. 6 is a view showing the structure of encoded data of a tile according to the third embodiment.
FIG. 7 is a view showing an example of the structure of JPEG encoded data.

FIG. 6 illustrates the structure of encoded data of each tile in a code stream generated according to the third embodiment. The encoded data is formed by concatenating the level 2 interpolation data and the level 1 interpolation data with the encoded ¼ reduced tile data.

The third embodiment can also implement simple and quick encoding processing, like the first and second embodiments. The number of pixels to which bitmap encoding processing (encoding processing by a lossy encoder 107 or a lossless encoder 108) that requires sophisticated calculation processing is applied is limited to only 1/16 the number of pixels of the original image data. This reduces the process load more than the first and second embodiments.

Note that a computer program can obviously implement processing corresponding to the third embodiment, as in the above-described modification of the first embodiment, and a description thereof will not be repeated.

[Fourth Embodiment]

In the above-described second and third embodiments, the configuration of interpolation methods is estimated from the code amount of interpolation data, and lossless or lossy encoding is selected. Estimating the configuration of interpolation methods is also possible based on the code amount of part of interpolation data. An example will be explained as the fourth embodiment.

The fourth embodiment is fundamentally the same as the second embodiment described above except that the operations of an interpolation data generator 110 and an encoding method selector 111 are slightly different. The different operation portions will be described below.

In the above-described second embodiment, the interpolation data generator 110 provides the interpolation data amount L of a tile of interest to the encoding method selector 111. In the fourth embodiment, out of the five block types (a) to (e) described in the first embodiment, a code amount Ld of interpolation data concerning the type (d) and a code amount Le of interpolation data concerning the type (e) are added, and the sum is provided to the encoding method selector 111. Interpolation data concerning the type (d) indicates codes output for a non-flat block that is processed in steps S1510 and S1511 of the processing procedure shown in FIG. 15. More specifically, it indicates codes output in steps S1504, S1506, S1507, S1510, and S1511 for a non-flat block up to steps S1510 and S1511. Interpolation data concerning the type (e) indicates codes output for a non-flat block that is processed in steps S1512 and S1513 of FIG. 15. It indicates codes output in steps S1504, S1512, and S1513 for a non-flat block up to steps S1512 and S1513.

The encoding method selector 111 compares the interpolation data code amounts Ld+Le provided from the interpolation data generator 110 with a predetermined threshold TH4. If Ld+Le<TH4, the encoding method selector 111 outputs a control signal "1" to apply lossless encoding. If Ld+Le≧TH4, the encoding method selector 111 outputs a control signal "0" to apply lossy encoding.

In a complex CG image or natural image, the sum of Ld and Le tends to be large. In such an image, distortion caused by lossy encoding is unnoticeable. Additionally, when restoring the original resolution, the influence of degradation of the reduced image is small. It is therefore possible to obtain effects such as high image quality, high compression performance, and easy and quick processing in this embodiment as well.

[Other Embodiments]

In the above-described embodiments, JPEG-LS is used as lossless encoding, and JPEG is used as lossy encoding. However, any other encoding method such as JPEG2000 or PNG may be applied, as described above.

In the above embodiments, when generating a ½ reduced image from the original image, the pixel $B_n(0,0)$ located at the upper left corner of a pixel block of 2×2 pixels is sampled as a pixel of the reduced image, and interpolation data of the remaining three non-sampling target pixels $B_n(0,1)$, $B_n(1,0)$, and $B_n(1,1)$ is generated. However, the pixel used for the reduced image is not necessarily that at the upper left corner of the block of 2×2 pixels. It can be any one of the pixels $B_n(0,1)$, $B_n(1,0)$, and $B_n(1,1)$. In short, when one of the pixels $B_n(0,1)$, $B_n(1,0)$, and $B_n(1,1)$ is used as the sampling target pixel X, the remaining three pixels can be defined as the pixels Xa, Xb, and Xc. Let X1 be the sampling target pixel included in an adjacent pixel block and located adjacent to the pixel Xa so as to be referred to restore the pixel Xa, X2 be the sampling target pixel included in another adjacent block and located adjacent to the pixel Xb so as to be referred to restore the pixel Xb, and X3 be the sampling target pixel included in still another adjacent block and located adjacent to the pixel Xc so as to be referred to restore the pixel Xc. In this case, if Xa=X1, and Xb=X2, and Xc=X3 are satisfied, the pixel block of interest is determined as a three-neighboring-pixel coincidence block.

The pixel block size may be defined as 3×3 pixels, and a reduced image whose numbers of horizontal and vertical pixels are ⅓ those of the original image may be generated by extracting one pixel from each pixel block.

In addition to extracting one pixel of a pixel block, the average color of the pixel block may be obtained to generate a reduced image. In this case, contrivance is given to the interpolation data configuration method so as to restore the original resolution image data in accordance with the reduced image generation method.

An example of the interpolation data configuration method capable of completely restoring the original resolution image data has been described above. However, the present invention is not limited to this. For example, if three or more colors are included in a pixel block, tone reduction or the like may be performed so as to generate interpolation data that can restore the original resolution but allows the pixel values to change to some extent.

In the above-described embodiments, image data is divided into tiles each having 32×32 pixels. The tile size is not limited to this and need only be an integer multiple of the pixel block size. Hence, any other block size such as 16×16, 64×64, or 128×128 is usable. A tile need not always be a square.

In the embodiments, the color space of the image is RGB. However, the present invention is obviously applicable to image data of various types such as CMYK, Lab, and YCrCb. That is, the present invention is not limited by the number of color components and the type of the color space.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-315030, filed Dec. 10, 2008, which is hereby incorporated by reference herein in its entirety.

What is claimed is:

1. An image encoding apparatus for encoding image data, comprising:
   a reduced image generator which generates reduced image data for input image data of an encoding target by outputting one pixel corresponding to N pixels in the input image data;
   an interpolation information generator which generates interpolation information to specify, from a plurality of types of interpolation methods, an interpolation method of N pixels of interest in order to generate, from the reduced image data, image data having a resolution identical to that of the input image data;
   a lossless encoder which executes lossless encoding of a block in the reduced image data;
   a lossy encoder which executes lossy encoding of the block;
   a selector which selects one of said lossless encoder and said lossy encoder based on the interpolation information corresponding to a block of interest in the reduced image data and causes the selected encoder to execute encoding processing of the block of interest; and
   an output unit which outputs, as encoded image data corresponding to the input image data, encoded data obtained by the encoder selected by said selector and the interpolation information generated by said interpolation information generator,
   wherein the types of interpolation methods represented by the interpolation information generated by said interpolation information generator include
   a first interpolation method of restoring the N pixels of interest from one pixel of a reduced image corresponding to the N pixels of interest or at least one pixel located around the one pixel of the reduced image, and
   a second interpolation method of restoring at least some of the N pixels of interest without referring to the reduced image.

2. The apparatus according to claim 1, wherein said selector selects one of said lossless encoder and said lossy encoder based on a distribution of the interpolation methods of the interpolation information corresponding to the block of interest.

3. The apparatus according to claim 2, wherein said selector estimates the distribution of the interpolation methods based on a code amount of the interpolation information corresponding to the block of interest.

4. The apparatus according to claim 3, wherein said selector compares a code amount L of the interpolation information corresponding to the block of interest with a predetermined threshold TH, and selects said lossless encoder if $L \leq TH$, and selects said lossy encoder if $L > TH$.

5. The apparatus according to claim 3, wherein said selector estimates the distribution of the interpolation methods based on a code amount concerning some specific interpolation methods out of the interpolation information corresponding to the block of interest.

6. The apparatus according to claim 1, wherein
   said reduced image generator recursively executes processing of generating reduced image data including M/N pixels a predetermined number of times by repeating, M/N times, processing of outputting one pixel corresponding to the N pixels in the input image data, where M is the total number of pixels of the input image data, and
   said interpolation information generator generates interpolation information from reduction source image data every time said reduced image generator generates reduced image data once.

7. A method of controlling an image encoding apparatus for encoding image data, comprising the steps of:
   generating reduced image data for input image data of an encoding target by outputting one pixel corresponding to N pixels in the input image data;
   generating interpolation information to specify, from a plurality of types of interpolation methods, an interpolation method of N pixels of interest in order to generate, from the reduced image data, image data having a resolution identical to that of the input image data;
   executing lossless encoding of a block in the reduced image data;
   executing lossy encoding of the block;
   selecting one of the step of executing lossless encoding and the step of executing lossy encoding based on the interpolation information corresponding to a block of interest in the reduced image data and causing the selected encoding step to execute encoding processing of the block of interest; and
   outputting, as encoded image data corresponding to the input image data, encoded data obtained in the encoding step selected in the step of selecting the encoding step and the interpolation information generated in the step of generating the interpolation information,
   wherein the types of interpolation methods represented by the interpolation information generated in the step of generating the interpolation information include
   a first interpolation method of restoring the N pixels of interest from one pixel of a reduced image corresponding to the N pixels of interest or at least one pixel located around the one pixel of the reduced image, and
   a second interpolation method of restoring at least some of the N pixels of interest without referring to the reduced image.

8. A non-transitory computer-readable storage medium storing, as a computer program, codes of executing each step recited in the method of claim 7.

* * * * *